United States Patent
Hunter

(10) Patent No.: US 6,511,309 B1
(45) Date of Patent: Jan. 28, 2003

(54) EXTRUDER DIE AND CUTTER ASSEMBLY FOR EXTRUDING FILLED FOOD PIECES

(75) Inventor: Thomas B. Hunter, Collinsville, IL (US)

(73) Assignee: Kerry, Inc., Beloit, WI (US)

( * ) Notice: Subject to any disclaimer, the term of this patent is extended or adjusted under 35 U.S.C. 154(b) by 0 days.

(21) Appl. No.: 09/576,766

(22) Filed: May 24, 2000

(51) Int. Cl.⁷ .......................... A21C 11/10; A21C 11/16
(52) U.S. Cl. ..................... 425/133.1; 425/311
(58) Field of Search ............................. 425/131.1, 133.1, 425/311; 426/513, 518

(56) References Cited

U.S. PATENT DOCUMENTS

| | | |
|---|---|---|
| 498,142 A | 5/1893 | Thoens |
| 936,722 A | 10/1909 | Howard |
| 2,042,940 A | 6/1936 | Herron |
| 2,125,729 A | 8/1938 | Kretchmer |
| 2,568,491 A | 9/1951 | Edwards |
| 2,982,231 A | 5/1961 | Fries |
| 3,314,381 A | 4/1967 | Fries et al. |
| 3,362,355 A | 1/1968 | Roth |
| 3,541,946 A | 11/1970 | Johnston |
| 3,764,715 A | 10/1973 | Henthorn et al. |
| 3,806,290 A | 4/1974 | Graff et al. |
| 3,807,919 A | 4/1974 | Kaufman, Jr. et al. |
| 3,860,373 A | 1/1975 | Kaufman et al. |
| 3,947,178 A * | 3/1976 | Belshaw et al. ............. 425/132 |
| 3,969,994 A | 7/1976 | Kaneko et al. |
| 4,015,518 A * | 4/1977 | Roth et al. .................. 99/450.6 |
| 4,025,260 A | 5/1977 | Neel |
| 4,251,201 A | 2/1981 | Krysiak |
| 4,259,051 A | 3/1981 | Shatila |
| 4,469,475 A | 9/1984 | Krysiak |
| 4,579,744 A | 4/1986 | Thulin et al. |
| 4,648,821 A | 3/1987 | Thulin |
| 4,659,580 A | 4/1987 | Svengren |
| 4,698,000 A | 10/1987 | Thulin et al. |
| 4,793,786 A | 12/1988 | Greenhouse et al. |
| 4,855,146 A | 8/1989 | Murakami et al. |
| 4,859,165 A | 8/1989 | Hoashi |
| 4,882,185 A | 11/1989 | Simelunas et al. |
| 5,449,281 A | 9/1995 | Dupart et al. |
| 5,773,043 A | 6/1998 | Hunter |
| 5,888,131 A | 3/1999 | Kobussen et al. |
| 5,906,838 A * | 5/1999 | Keehn et al. ............. 425/131.1 |
| 6,206,678 B1 | 3/2001 | Keehn et al. |

* cited by examiner

Primary Examiner—Jan H. Silbaugh
Assistant Examiner—Donald Heckenberg
(74) Attorney, Agent, or Firm—Birch, Stewart, Kolasch & Birch, LLP

(57) ABSTRACT

A die and cutter assembly for an extruder for producing an extruded food piece containing a filling includes an elongated annular extrusion member with an extrusion wall formed on a first end thereof, a closed extrusion end formed adjacent said extrusion wall, and an opened feed end formed on a second, opposite end of said elongated annular extrusion member attachable in fluid communication with a manifold of the extruder. Furthermore, a filling tube extends into the elongated annular extrusion member and includes an extension formed on the elongated annular extrusion member substantially at a right angle thereto. A tube extension is formed on the filling tube substantially at a right angle thereto and located within the extension of the elongated annular extrusion member. In addition, an extrusion die is formed on the extension of the elongated annular extrusion member and a cutter member having an opened driveable end, an elongated cutter wall, and an opened cutter end with a cutting surface for cutting extrudate to a desired length as the extrudate exits the die is disposed at least partially over and reciprocally slideable on the extrusion wall and operably connectable at the driveable end to a drive device for reciprocatably sliding the cutter member over and away from the extrusion die.

16 Claims, 5 Drawing Sheets

EXTRUDER DIE AND CUTTER ASSEMBLY FOR EXTRUDING FILLED FOOD PIECES

BACKGROUND OF THE INVENTION

1. Field of the Invention

The present invention relates to an extruder die and cutter assembly for extruding filled food pieces. More particularly, the present invention relates to an extruder die and cutter assembly which includes an extension formed on an extrusion member and a filling tube for allowing the extrudate to exit the die and cutter assembly from the side.

2. Description of Related Art

Extruders for producing extruded food pieces are known. Such extruders can conventionally include a pressure vessel for containing, under pressure, a mash of the food to be extruded. Furthermore, pressure exerting means for maintaining pressure in the pressure vessel, a manifold in fluid communication with the pressure vessel, and a die and cutter assembly, generally located underneath the pressure vessel, in fluid communication with the manifold can be included. The extruded food is cut to size by a die and cutter assembly.

Food products that can be extruded in such extruders include, e.g., meats, poultry, seafood, cereal grains, vegetables, fruits, and solid dairy products. As specific examples, the mash may be prepared from beef, chicken, shrimp, wheat, corn, rice, potatoes, apples, and cheese.

The food is ground to a particle size consistent with forming a fluid mash, e.g., particle sizes that will pass through a U.S. Screen Series No. 5 screen, more usually a No. 10 screen, and often a No. 20 screen up to about a No. 100 screen.

Water or other dispersing liquids, e.g., 3% to 70%, may be added to the ground food in order to produce a liquid mash. Binders, flavors, preservatives, colors, stabilizers, antioxidants, and the like may be added to the mash, in conventional amounts. Most often, a gelling material is added to the mash, e.g., a settable gum or pectate, for example, guar gum and sodium alginate, in conventional amounts of about 0.1% to 25%. The gum or pectate is set by a gelling agent, e.g., a 0.5% to 10% solution of calcium chloride and sodium alginate.

Industry has not yet, however, made great progress in providing an extruded foodstuff containing a filling.

SUMMARY OF THE INVENTION

It is an object of the present invention to provide an extruder die and cutter assembly which makes up for the above deficiencies of the prior art. Specifically, it is an object of the present invention to provide an extruder die and cutter assembly which includes an extruded product having a filling.

It is another object of the present invention to provide an extruder die and cutter assembly which includes extensions formed on the extrusion member and the filling tube to allow for the extrudate to exit the die and cutter assembly from the side.

It is yet another object of the present invention to provide an extrusion die and cutter assembly having a cutting member for cooperating with the extrusion member to cut and crimp the extrudate exiting the die and cutter assembly to form food products of a predetermined length.

In order to accomplish the above objects of the present invention, a die and cutter assembly for an extruder for producing an extruded food piece containing a filling has been provided. The die and cutter assembly includes an elongated annular extrusion member with an extrusion wall formed on a first end thereof, a closed extrusion end formed adjacent said extrusion wall, and an opened feed end formed on a second, opposite end of said elongated annular extrusion member attachable in fluid communication with a manifold of the extruder. Furthermore, a filling tube extends into the elongated annular extrusion member and includes an extension formed on the elongated annular extrusion member substantially at a right angle thereto. A tube extension is formed on the filling tube substantially at a right angle thereto and located within the extension of the elongated annular extrusion member. In addition, an extrusion die is formed on the extension of the elongated annular extrusion member and a cutter member having an opened driveable end, an elongated cutter wall, and an opened cutter end with a cutting surface for cutting extrudate to a desired length as the extrudate exits the die is disposed at least partially over and reciprocally slideable on the extrusion wall and operably connectable at the driveable end to a drive device for reciprocatably sliding the cutter member over and away from the extrusion die.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
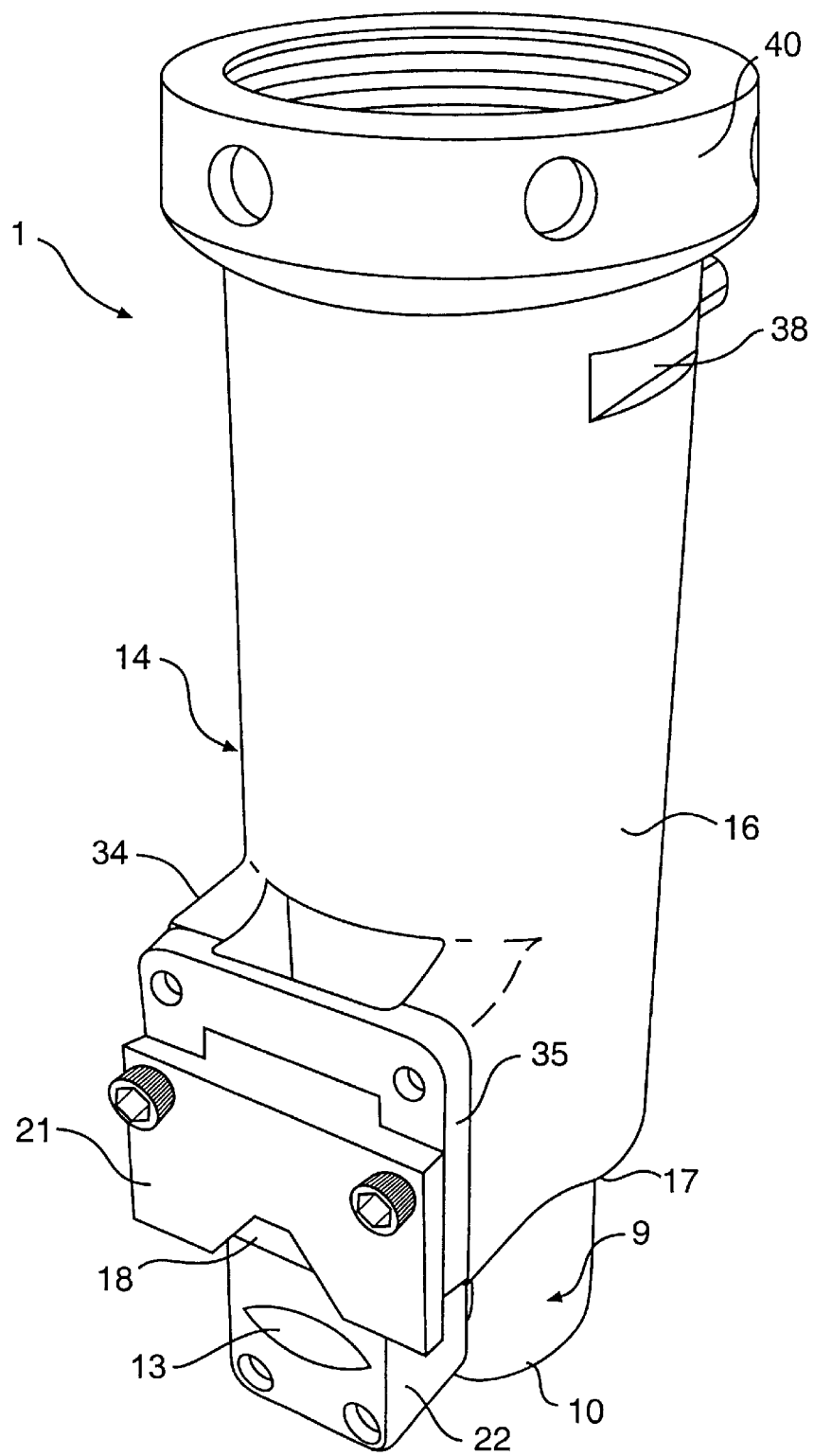
FIG. 1 is a perspective view of the die and cutter assembly of the present invention.

The present invention will now be described with reference to the accompanying drawings in which the same reference numerals have been used to identify the same or similar elements.

Figure 2:
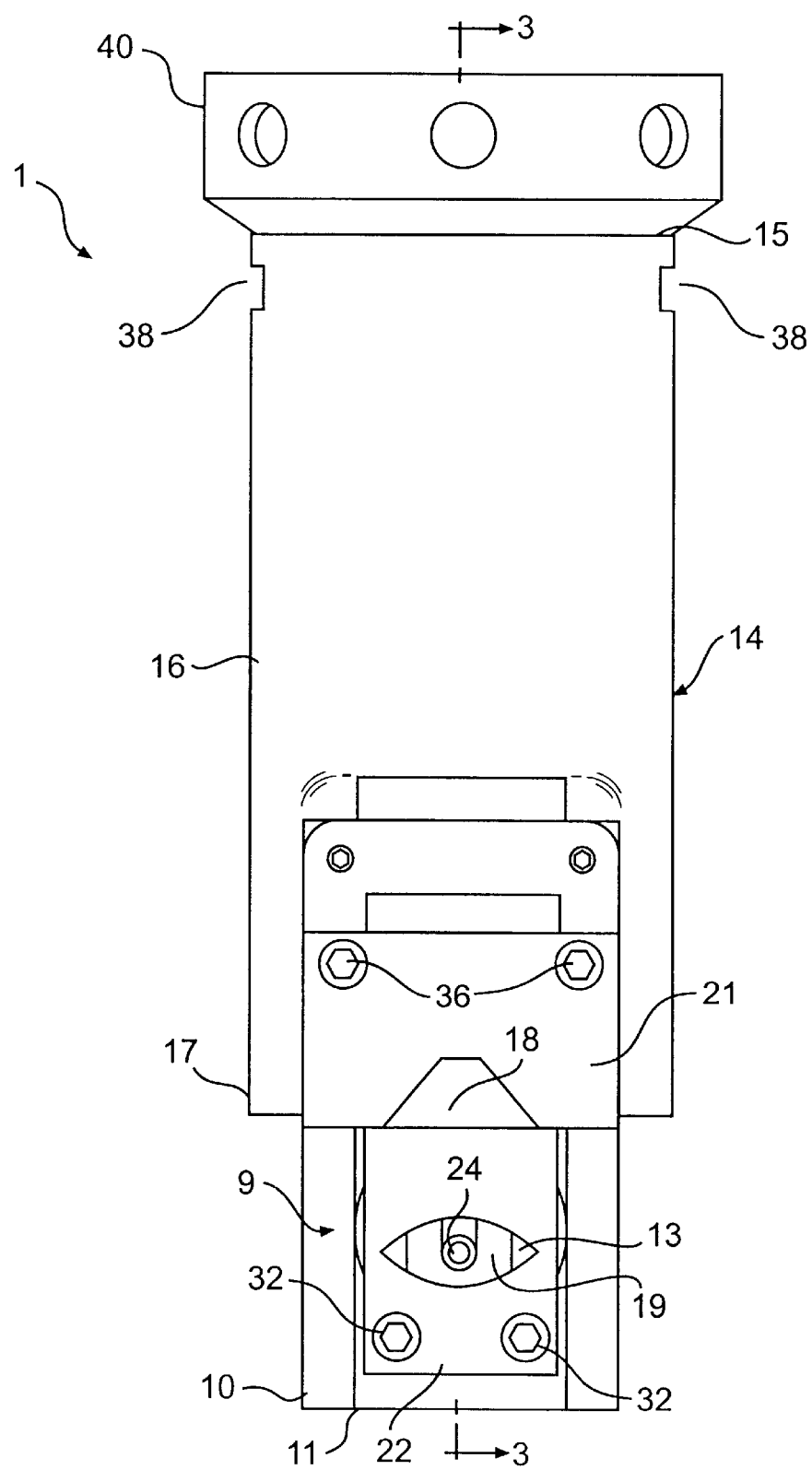
FIG. 2 is a front elevation of the die and cutter assembly of the present invention illustrating the "ready to cut" state.
Figure 3:
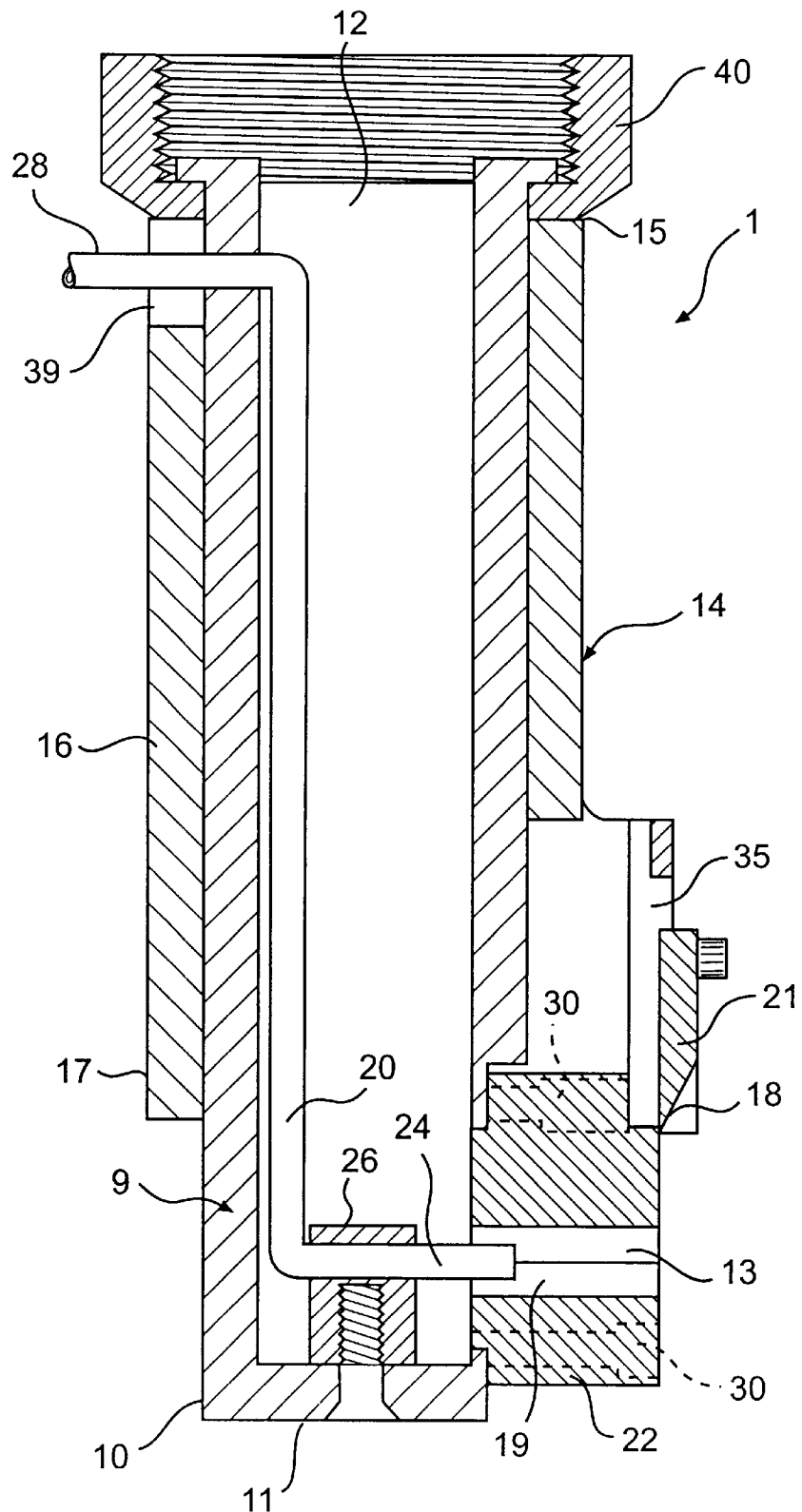
FIG. 3 is a cross-section of the die and cutter assembly of the present invention along line 3—3 of FIG. 2.

FIGS. 1–3 illustrate the die and cutter assembly of the present invention in the "ready to cut" state. Referring to FIGS. 1–3, the die and cutter assembly of the present invention 1 includes an elongated annular extrusion member 9 having an extrusion wall 10 formed at a lower end thereof. A closed extrusion end 11 is formed adjacent the extrusion end 10 and an opened feed end 12 (see FIG. 3) is formed adjacent an upper end of the extrusion member 9. The closed extrusion end 11 is stationary relative to the extrusion member 9. The die and cutter assembly of the present invention is attachable to an extruder, such as the extruder described in U.S. Pat. No. 5,773,043, and will therefore not be described in detail. The opened feed end 12 is attachable in fluid communication to a manifold (not shown) by, for example, a threaded flange 40. The manifold is connectable to a pressure vessel (not shown) for containing a mash under pressure by a pressure exerting device (not shown).

A filling tube 20 extends into the extrusion member 9. The filling tube is also in fluid communication with a second manifold (not shown), which is connectable to a second pressure vessel (not shown) for containing a filling under pressure by a second pressure exerting device (not shown).

It is noted that the manifolds are included in the embodiment described above for distributing the mash and the filling to a plurality of die and cutter assemblies. However, if only one die and cutter assembly is to be used, the necessity of the manifolds is eliminated.

The extrusion member 9 includes an extension 22 formed at substantially a right angle to an axis of the extrusion member 9. The extension 22 is mounted to the extrusion member 9 at a side surface thereof by, for example, a plurality of screws 32 which extend through respective holes 30 formed in the extension 22 (see FIGS. 2 and 3). The extension 22 also includes an extrusion die 13 on an end thereof for cooperating with a cutting element 21 of a cutter member 14 as will be described hereinbelow.

Furthermore, an extension 24 is formed on the filling tube 20 at substantially a right angle to the axis of the filling tube 20. Referring specifically to FIGS. 2 and 3, the extension 24 is located generally centrally of the extension 22 of the extrusion member 9. The extension 24 of the filling tube 20 extends within an extrusion passageway 19 formed in the extension 22 of the extrusion member 9. The extension 24 of the filling tube is always in open communication with the extrusion passageway 19. Referring to FIG. 3, the extension 24 of the filling tube 20 is mounted to the extrusion member 9 by a support block 26 and includes an upper portion 28 adjacent the upperfeed end 12, which is bent at substantially a right angle to an axis of the extrusion member 9 to extend through the extrusion member 9. The upper portion 28 is attachable to a manifold as described above.

The die and cutter assembly 1 of the present invention also includes a cutter member 14 having an opened driveable end 15, an elongated cutter wall 16, and an opened cutter end 17. The cutter wall 16 includes a housing or extension 34 formed thereon for supporting a cutting element 21. The cutting element 21 includes a cutting surface 18 for cooperating with the extrusion die 13 to cut and crimp extrudate to a desired length as the extrudate exits the extrusion die 13. The cutting element 21 is mounted to a face plate 35 mounted on the extension 34 by a plurality of screws 36. The cutting surface 18 of the cutting element 21 is formed at an angle between 25 to 90° to a surface of said cutting element 21.

Referring to FIG. 2, the elongated cutter wall 16 includes two cut-out portions 38 formed on an outside surface thereof adjacent the opened driveable end 15. The cut-out portions 38 are for receiving the operable end of a drive device (not shown) in order to reciprocate the cutting member 14 and therefore the cutting element 21 up and down in cooperation with the extrusion die 13. The drive device can be any well known device for reciprocating the cutting member 14. The elongated cutter wall 16 also includes a cut-out 39 for allowing passage of the upper portion 28 of the filling tube 20

It is noted that the extrusion wall 10 and the cutter member 14 are illustrated having a tubular shape; however, it can be readily understood that they can be made in other cooperating shapes as well. All that is necessary is for the cutting member 14 to have an inside diameter of generally the same size and shape as the outside diameter and shape of the extrusion wall 10 to allow the cutting member 14 to reciprocate in a sliding manner on the outside of the extrusion wall 10.

Figure 4:
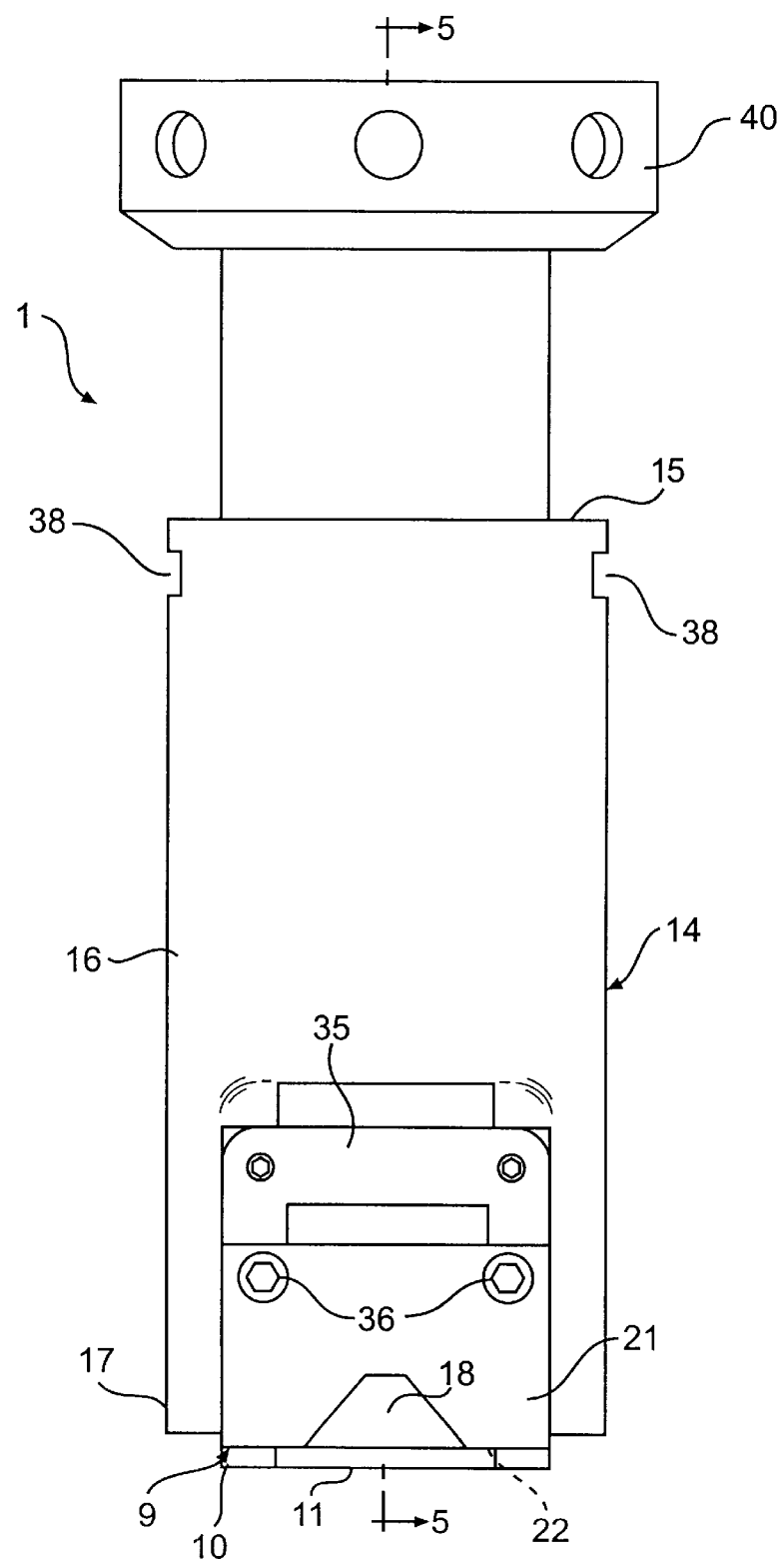
FIG. 4 is a front elevation of the die and cutter assembly of the present invention illustrating the "after cut" state.
Figure 5:
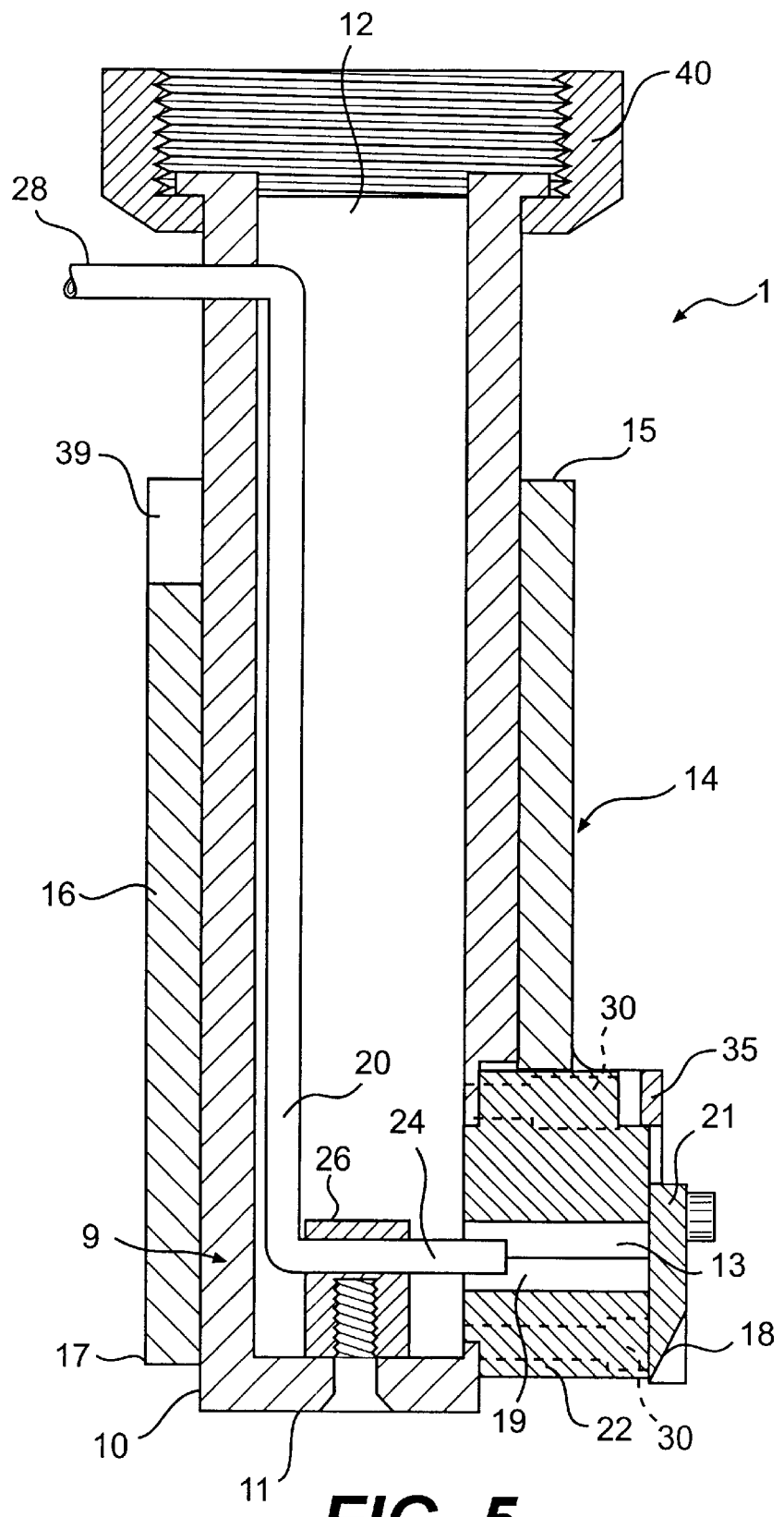
FIG. 5 is a cross-section of the die and cutter assembly of the present invention along line 5—5 of FIG. 4.

The operation of the die and cutter assembly of the present invention will now be described with reference to FIGS. 2–5. FIGS. 2 and 3 illustrate the "ready to cut" state, while FIGS. 4 and 5 illustrate the "after cut" state. Referring to FIGS. 2 and 3, the mash is forced through the opened fixed end 12 of the extrusion member 9 from the pressure vessel for containing a mash of food while the cutter member 14 is in the upper position. The filling is also forced through the filling tube 20 from the pressure vessel for containing filling. As noted above, if a plurality of die and cutter assemblies are used, the mash and filling are also fed through first and second manifolds, respectively, for distributing the mash and filling to the die and cutter assemblies.

Referring specifically to FIG. 3, the mash and filling merge together in the extrusion passageway 19 and are forced through the extrusion die 13. Once a predetermined length of extrudate is fed through the extrusion die 13, the cutter member 14 is moved from the position illustrated in FIGS. 2 and 3 to the position illustrated in FIGS. 4 and 5 to cut the extrudate to the predetermined length. The movement of the cutter member drives the cutting surface 18 of the cutting element into cooperation with the extrusion die 13 in order to cut the extrudate and crimp the extrudate to ensure that the filling remains within the extruded food product after being cut.

The above operation occurs continuously with the extrudate exiting the extrusion die 13 and being cut by the reciprocating cutting member 14 in order produce food products of a predetermined length.

A wide variety of filling materials, for instance, jams, cheeses, barbecue sauces, gravies, gelatins, etc. can be placed into extruded foodstuffs in accordance with the present invention. The filling will generally be in the form of a viscous liquid or a paste, although it would also be possible to fill an extruded foodstuff with a flowable powder using the apparatus of the present invention. Food products that can be extruded and filled with the above filling materials include, e.g., meats, poultry, seafood, cereal grains, vegetables, fruits, dough, and solid dairy products. As specific examples, the mash may be prepared from beef, chicken, shrimp, wheat, corn, rice, potatoes, apples, and cheese.

The shape and size of the extrusion die 13 can be varied widely, in order to provide differently shaped and sized foodstuffs. Likewise, the shape, size, and, if desired, location of the extension 24 of the filling tube 20 can be varied widely, in order to provide for different amounts and/or locations of filling within the extruded foodstuff.

The cutter member 14 is disposed at least partially over and reciprocally slideable on the tubular extrusion wall and is operably connected at the driveable end to a drive device for reciprocatably sliding the cutter member over and away from the extrusion die 13. The rate of number of strokes per minute (down and up) at which the cutter member can operate can range from 80 strokes/minute through 500 strokes/minute.

The pressure in the pressure vessel will vary considerably from mash to mash and die to die, but pressures of 1 to 250 psig are normally used, especially with the usual mash temperatures of 25° F. to 75° F. Water or other dispersing liquids, e.g., 3% to 70%, may be added to the ground food in order to produce a liquid mash. Binders, flavors, preservatives, colors, stabilizers, antioxidants, and the like may be added to the mash, in conventional amounts. Most often, a gelling material is added to the mash, e.g., a settable gum or pectate, for example, guar gum and sodium alginate, in conventional amounts of about 0.1% to 25%. The gum or pectate is set by a gelling agent, e.g., a 0.5% to 10% solution of calcium chloride and sodium alginate.

The length of individual products extruded in accordance with the present invention will depend upon both the rate at which the cutter member operates and the rate at which the product is extruded, the latter being a function of the viscosity of the product in the pressure vessel and the pressure being applied to that product.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A die and cutter assembly for an extruder for producing an extruded food piece containing a filling, said extruder including a first pressure exerting means for maintaining a mash of the food under pressure, a second pressure exerting means for maintaining the filling under pressure, and first and second manifolds in fluid communication with the first and second pressure exerting means, respectively, said die and cutter assembly being attachable in fluid communication with the first and second manifolds, and comprising:

an elongated annular extrusion member with an extrusion wall formed on a first end thereof;

a closed extrusion end formed adjacent said extrusion wall, said closed extrusion end being stationary relative to said elongated annular extrusion member;

an opened feed end formed on a second, opposite end of said elongated annular extrusion member, said opened feed end being attachable in fluid communication with the first manifold of the extruder;

a filling tube extending into said elongated annular extrusion member, said filling tube being attachable to the second manifold of the extruder;

an extension formed on said elongated annular extrusion member substantially at a right angle thereto;

a tube extension formed on said filling tube substantially at a right angle thereto and located within said extension of said elongated annular extrusion member;

an extrusion die formed on said extension of said elongated annular extrusion member; and a cutter member having an opened driveable end, an elongated cutter wall, and an opened cutter end with a cutting surface for cutting extrudate to a desired length as the extrudate exits the die, said cutter member being disposed at least partially over and reciprocally slideable on the extrusion wall and operably connectable at the driveable end to a drive device of the extruder for reciprocatably sliding the cutting surface of the cutter member over and away from the extrusion die.

2. The die and cutter assembly according to claim 1, wherein said cutter member includes a housing extending from an outside surface of said elongated cutter wall, said cutting surface being located on said housing in cooperative relationship with said extrusion die.

3. The die and cutter assembly according to claim 2, wherein said cutting surface is formed on a cutting element mounted to said housing, said cutting surface is formed at an angle to a surface of said extrusion die.

4. The die and cutter assembly according to claim 3, wherein said angle is between 25 and 90° with respect to said surface of said extrusion die.

5. The die and cutter assembly according to claim 1, wherein said filling tube includes an entry tube formed on an end of said filling tube opposite said tube extension, said entry tube extending transverse to an axis of said filling tube and being connectable to the second pressure vessel for containing filling under pressure.

6. The die and cutter assembly according to claim 1, wherein said cutter member is tubular and said elongated cutter wall includes an inside diameter generally the same diameter as an outside diameter of said extrusion wall, said cutter member being slidable on said extrusion wall to reciprocate said cutting surface in cooperation with said extrusion die.

7. A die and cutter assembly for an extruder, comprising:

an elongated annular extrusion member having a first, open end and a second, closed end, said first, opened end being attachable in fluid communication with a first manifold of the extruder, said closed end being stationary relative to said elongated annular extrusion member;

an extension formed on said elongated annular extrusion member substantially at a right angle thereto;

a filling tube extending into said elongated annular extrusion member, said filling tube including a tube extension formed thereon substantially at a right angle thereto and located within said extension of said elongated annular extrusion member, said filling tube being attachable to a second manifold of the extruder;

an extrusion die formed on said extension of said elongated annular extrusion member; and a cutter member having an opened driveable end, an elongated cutter wall, and an opened cutter end with a cutting surface for cutting extrudate to a desired length as the extrudate exits the die, said cutter member being disposed at least partially over and reciprocally slideable on the extrusion member and operably connectable at the driveable end to a drive device of the extruder for reciprocatably sliding the cutting surface of the cutter member over and away from the extrusion die.

8. The die and cutter assembly according to claim 7, wherein said cutter member includes a housing extending from an outside surface of said elongated cutter wall, said cutting surface being located on said housing in cooperative relationship with said extrusion die.

9. The die and cutter assembly according to claim 8, wherein said cutting surface is formed on a cutting element mounted to said housing, said cutting surface is formed at an angle to a surface of said extrusion die.

10. The die and cutter assembly according to claim 9, wherein said angle is between 25 and 90° with respect to said surface of said housing.

11. The die and cutter assembly according to claim 7, wherein said filling tube includes an entry tube formed on an end of said filling tube opposite said tube extension, said entry tube extending transverse to an axis of said filling tube.

12. The die and cutter assembly according to claim 7, wherein said cutter member is tubular and said elongated cutter wall includes an inside diameter generally the same diameter as an outside diameter of said extrusion wall, said cutter member being slidable on said extrusion wall to reciprocate said cutting surface in cooperation with said extrusion die.

13. The die and cutter assembly according to claim 1, wherein said filling tube includes an upper portion adjacent said opened feed end, said upper portion extending substantially at a right angle to an axis of said elongated annular extrusion member.

14. The die and cutter assembly according to claim 1, wherein said filling tube is always in open communication with said extension of said elongated annular extrusion member.

15. The die and cutter assembly according to claim 7, wherein said filling tube includes an upper portion adjacent said open end of said elongated annular extrusion member, said upper portion extending substantially at a right angle to an axis of said elongated annular extrusion member.

16. The die and cutter assembly according to claim 7, wherein said filling tube is always in open communication with said extension of said elongated annular extrusion member.

* * * * *